US012006135B2

(12) United States Patent
Corrigan

(10) Patent No.: US 12,006,135 B2
(45) Date of Patent: Jun. 11, 2024

(54) BULK MATERIAL SHIPPING CONTAINER HAVING A MATERIAL LOADING ASSEMBLY WITH AN OPERATING MECHANISM

(71) Applicant: SANDBOX LOGISTICS, LLC, Houston, TX (US)

(72) Inventor: Kevin Sylvester Corrigan, Forest Park, IL (US)

( * ) Notice: Subject to any disclaimer, the term of this patent is extended or adjusted under 35 U.S.C. 154(b) by 494 days.

(21) Appl. No.: 16/984,255

(22) Filed: Aug. 4, 2020

(65) Prior Publication Data

US 2022/0041369 A1 Feb. 10, 2022

(51) Int. Cl.

| | |
|---|---|
| ***B65D 88/54*** | (2006.01) |
| ***B65D 88/12*** | (2006.01) |
| ***E05B 85/26*** | (2014.01) |
| *E05B 15/02* | (2006.01) |
| *E05B 85/04* | (2014.01) |

(52) U.S. Cl.

CPC ........... *B65D 88/54* (2013.01); *B65D 88/126* (2013.01); *E05B 15/022* (2013.01); *E05B 85/045* (2013.01); *E05B 85/26* (2013.01)

(58) Field of Classification Search

CPC .......... B65D 2251/1058; B65D 88/126; E05B 83/02; E05B 83/08; E05B 83/12; E05B 85/04; E05B 85/045; E05B 85/20; E05B 85/24; E05B 85/243; E05B 85/26; E05B 15/02; E05B 15/022; E05C 7/04; E05C 19/001; Y10S 292/21; Y10S 292/32

USPC .................................................. 220/324, 326

See application file for complete search history.

(56) References Cited

U.S. PATENT DOCUMENTS

| | | | | |
|---|---|---|---|---|
| 4,545,523 A * | 10/1985 | Galbreath | B65D 88/126 | 220/908 |
| 6,394,496 B1 * | 5/2002 | Piona | B65D 88/126 | 280/830 |
| 7,320,488 B2 * | 1/2008 | Hidding | E05B 85/243 | 292/216 |
| 7,726,707 B2 * | 6/2010 | Simchayoff | E05B 85/045 | 292/201 |
| 8,075,027 B2 * | 12/2011 | Zweibohmer | E05C 3/24 | 292/216 |
| 10,272,814 B2 * | 4/2019 | Haag | B65D 88/126 | |
| 10,676,967 B2 * | 6/2020 | Schwickerath | E05B 63/0056 | |

* cited by examiner

*Primary Examiner* — Kristina R Fulton
*Assistant Examiner* — Noah Horowitz
(74) *Attorney, Agent, or Firm* — Osha Bergman Watanabe & Burton LLP

(57) ABSTRACT

A material loading assembly is connected to a top of a container body having an opening for loading the container. A door is coupled to the top to cover the opening. An operating mechanism includes an extension member connected to the door and has a free end extending past an edge of the door. The extension member has an engagement pin formed on the free end. A latch mechanism attached at an edge of the shipping container has a pin seat formed therein and a locking member positionable between a locked position and an unlocked position. The locking member retains the engagement pin in the pin seat for locking the door in a closed position. The locking member releases the engagement from the pin seat for unlocking the door in the closed position, so the door is free move from the closed position to an open position.

12 Claims, 10 Drawing Sheets

BULK MATERIAL SHIPPING CONTAINER HAVING A MATERIAL LOADING ASSEMBLY WITH AN OPERATING MECHANISM

FIELD

The present disclosure relates to bulk material shipping containers and more particularly to a door structure for a bulk material shipping container having an operating mechanism for a door structure of a material loading assembly.

BACKGROUND

Various bulk material shipping containers are generally known and used to transport a wide range of products, parts, components, items, and other materials such as, but not limited to, seeds, shavings, fasteners, dry bulk, plastic resins, and granular materials (such as but not limited to cement or sand). These materials are sometimes called loose materials.

New and improved bulk material shipping containers are continuously being developed. For example, U.S. Published Patent Application No. 2018/0002066, which is owned by the assignee of the present application and incorporated herein by reference, discloses relatively new bulk material shipping containers.

There is a continuing need for better bulk material shipping containers for loose materials and for mechanisms for loading such bulk material shipping containers.

SUMMARY

Various embodiments of the present disclosure provide a bulk material shipping container that provides various advantages over previously-known, commercially-available bulk shipping material containers. In general, these containers include a base, a container body connected to and supported by the base, a material unloading mechanism positioned at and/or under a central bottom portion of the container body and connected to and supported by the base, and a material loading assembly connected to and supported by the top assembly of the container body. The material loading assembly includes a door structure and an operating mechanism for moving and locking the door structure that is operable by a user standing adjacent to the bulk material shipping container. Depending on the height of the bulk material shipping container, the user may either directly operate the operating mechanism or may use a separate device such as an extended arm or pole, for example.

For purposes of brevity, the bulk material shipping container of the present disclosure may sometimes be referred to herein as a material shipping container, a shipping container, or simply as a container. For purposes of brevity, a person who uses the container may sometimes be referred to herein as a "user" or an "operator", a person who loads loose materials into a container may sometimes be referred to herein as a "loader," and a person who removes the loose materials from a container may sometimes be referred to herein as an "unloader."

Additional features and advantages of container, material loading assembly, door structure and operating mechanism are described in, and will be apparent from the following Detailed Description and appended drawings.

DETAILED DESCRIPTION

Figure 1:
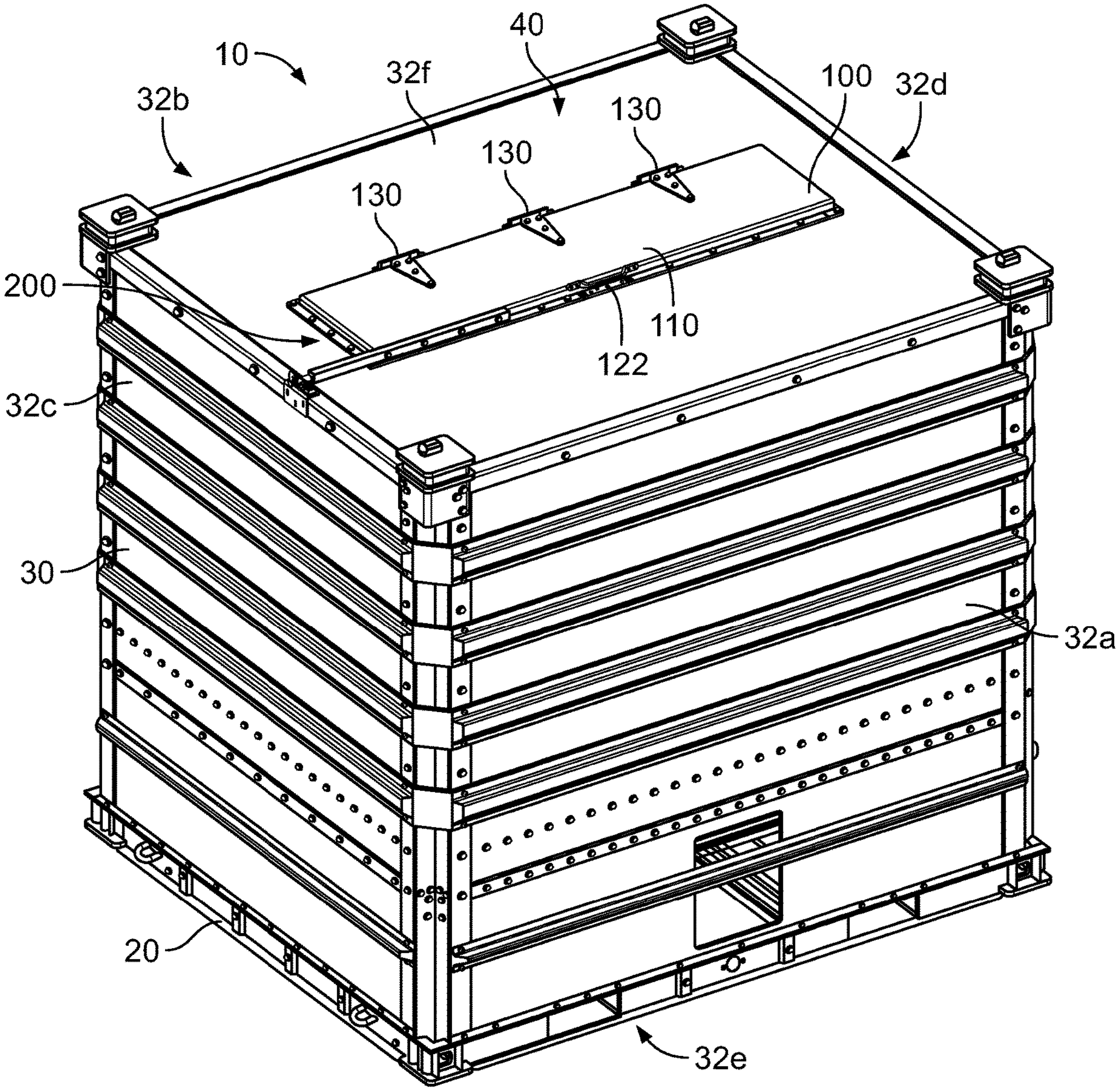
FIG. 1 is a top front perspective view of the bulk material shipping container including a material loading assembly having a door structure and an operating mechanism.
Figure 2:
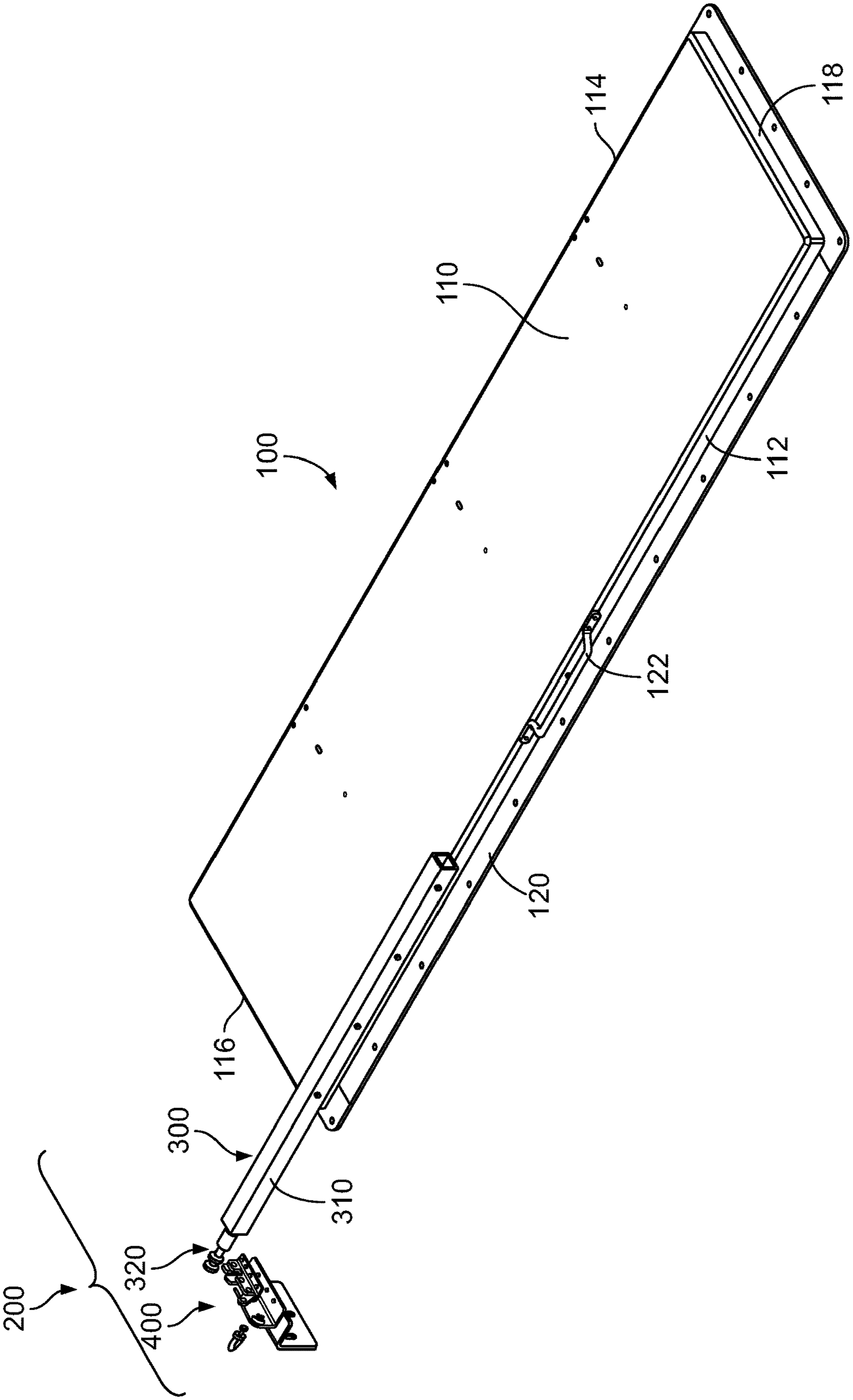
FIG. 2 is a top front perspective view of the door structure and operating mechanism of FIG. 1.
Figure 3:
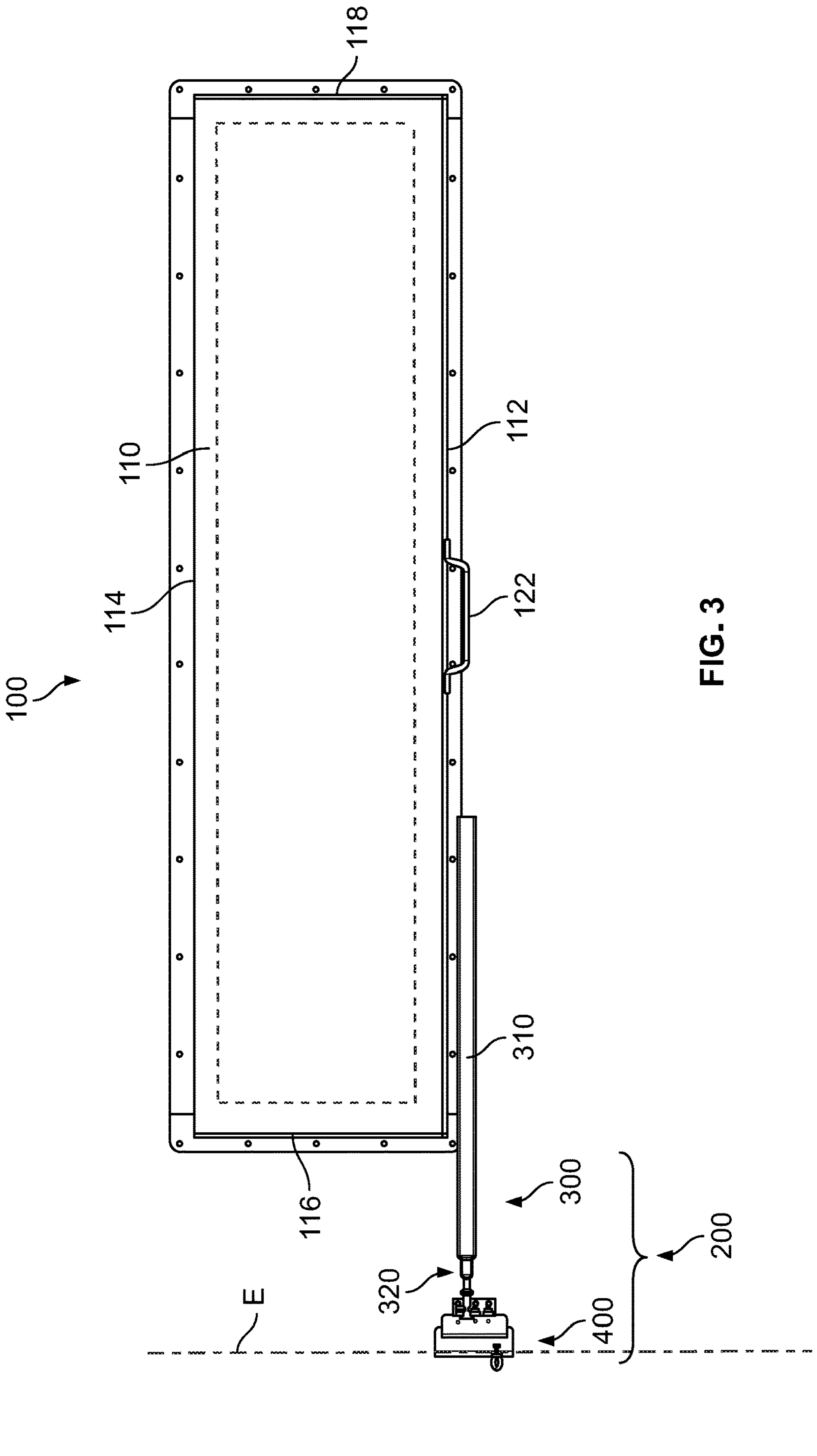
FIG. 3 is a top view of the door structure and operating mechanism of FIG. 1, not including the hinges.
Figure 4:
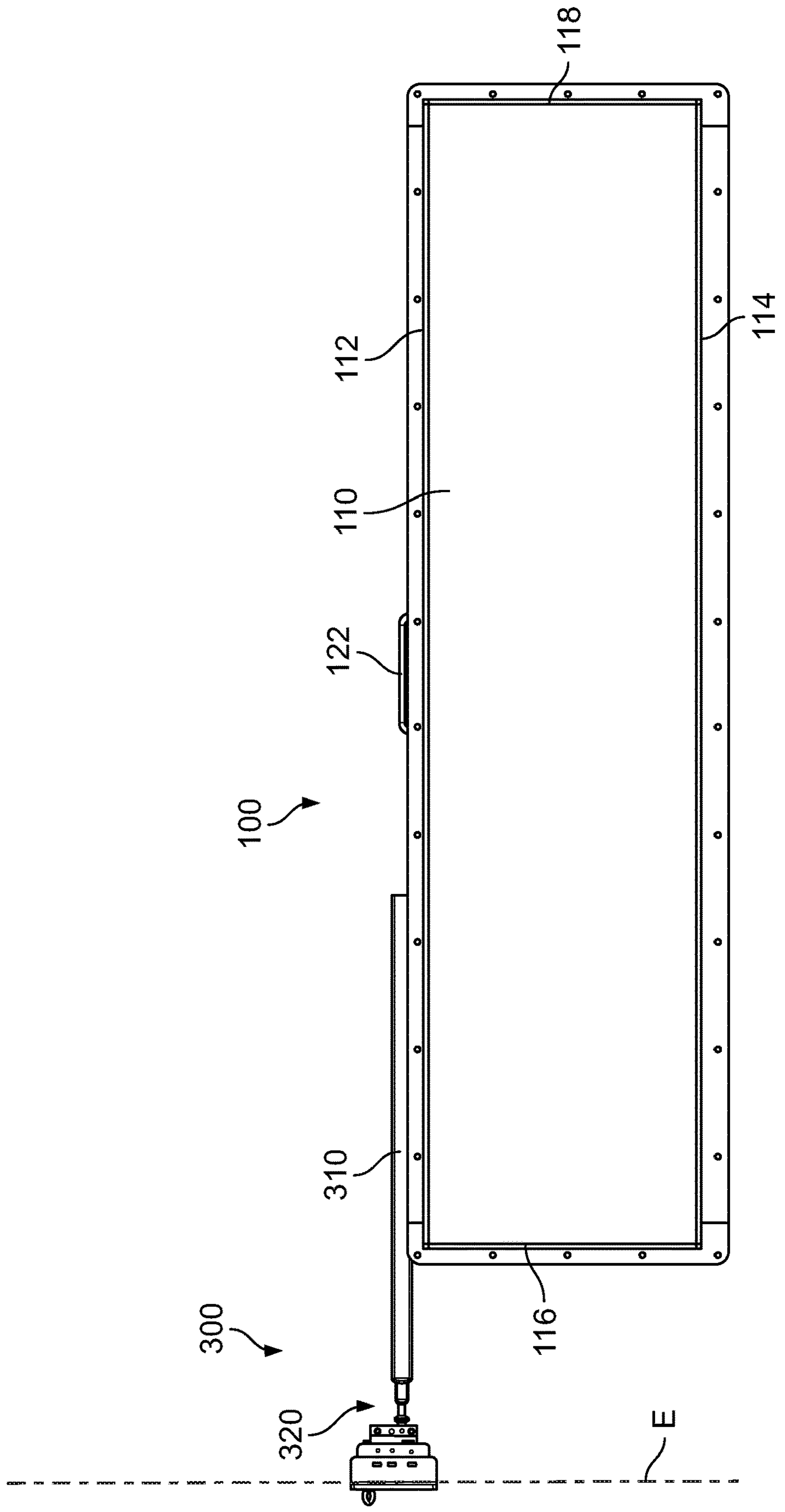
FIG. 4 is a bottom view of the door structure and operating mechanism of FIG. 1, not including the hinges.
Figure 5:
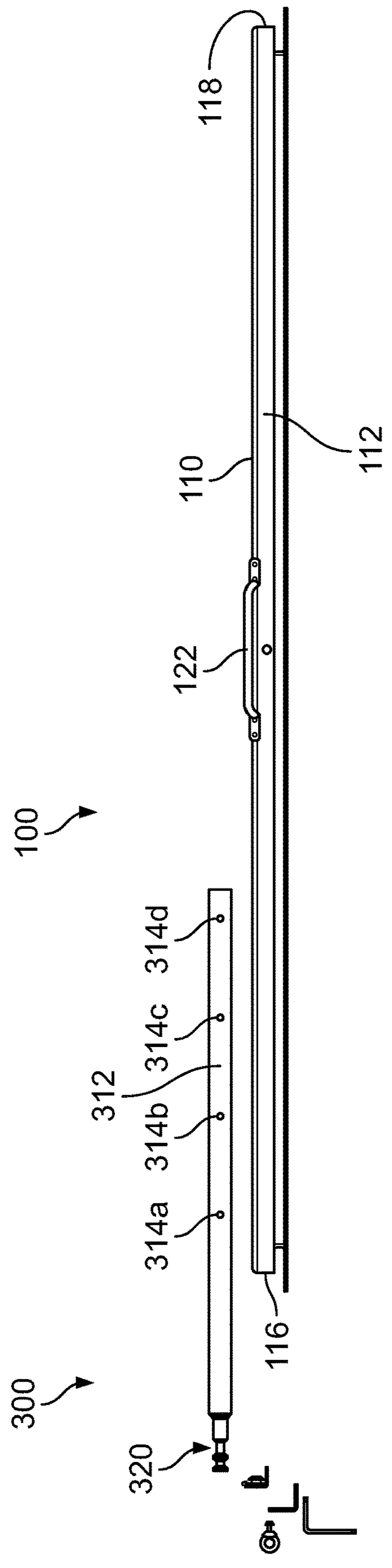
FIG. 5 is a front side view of the door structure and operating mechanism of FIG. 1, not including the hinges.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, secured, attached, etc., are not intended to be limited to direct mounting methods but should be interpreted broadly to include direct mounting, indirect mounting and/or operable coupling means and methods. In this way, the following specification is intended to be considered as a whole and interpreted accordingly from the perspective and understanding of one of ordinary skill in the art. It should be understood that modifications and variations may be effected without departing from the scope of the novel concepts of the present disclosure, and it should be understood that the scope of the claimed subject matter is only defined the appended claims.

Referring now to the drawings, FIG. 1 illustrates a bulk material shipping container, which is generally indicated by numeral 10 and configured to receive, hold, and release loose materials of substantial weight and volume. The bulk material shipping container of the present disclosure includes various embodiments and improvements such as the containers described in U.S. Pat. No. 8,887,914 and U.S. Pub. Pat. App. No. 2018/0002066 which are incorporated herein by reference.

Generally, the shipping container 10 includes a base 20, a container body 30 connected to and supported by the base 20, a material unloading assembly (not shown) positioned at and under a central bottom portion of the container body 30 and connected to and supported by the base 20, a material loading assembly 40 connected in part to and supported by a top of the container body 30. The base 20 is configured to facilitate movement of the container 10 and stacking of multiple containers 10. The material unloading assembly is connected to the base 20 and operable to dispense or unload loose materials from the container body 30 of the container 10. The container body 30 is connected to and supported by the base 20 and configured to admit, retain and dispense loose materials. The material loading assembly 40 is, in part, connected to and supported by the top of the container body 30 and operable to access the container body 30 for loading loose materials into and preventing contaminants from entering the container body 30.

As further explained below, the bulk material shipping container of the present disclosure provides an improved bulk material shipping container for loose materials that enables a user to open and close a door on top of the container without being physically located on the top of the container. Many bulk material shipping containers are configured to make use of gravity to load and unload materials. As such, it is often beneficial to load material into the container through the top of the container and unload material through the bottom. Where the container height is relatively tall with respect to the user, the opening on top through which materials are loaded is not easily accessible from the ground. In accordance with the present disclosure, the container 10 enables a user to operate the door structure that is positioned on top of the container, while the user remains adjacent to a side of the container. More particularly, the bulk material shipping container of the present disclosure includes a new material loading assembly described in detail herein.

The base 20 and various parts of the container body 30 are only very generally described herein for brevity; and it should be appreciated that further details of the base 20 and the container body 30 are set forth in US 2018/0002066. With continued reference to FIG. 1, the base 20 is specifically configured to be lifted by a lifting vehicle such as a forklift truck to lift, move, and position or place the container 10 at a manufacturing site, a transportation site, a material loading facility, a transport vehicle, a material unloading facility, a storage facility, a container unloading facility, a material unloading device, whether having loose material contained therein or not. The container 10 and specifically the base 20 is configured to receive tines of a forklift truck for lifting, moving, stacking, unstacking, placing and/or positioning the container 10 on a material unloading device, such as one of the material unloading devices described in U.S. Pat. No. 9,650,216 or U.S. Pub. Pat. App. No. 2018/0002120.

The material unloading assembly enables the container 10 to unload loose materials. The material unloading assembly can take various forms, and may include a hinged or sliding gate, a material director or chute, and/or various other parts.

The container body 30 defines an interior volume chamber or material holding space configured to admit, retain and dispense loose materials. As illustrated in FIG. 1, the container 10 is a six-sided polyhedron having a front wall 32*a*, a rear wall 32*b* opposite the front wall, a first side wall 32*c*, a second side wall 32*d* opposite the right sidewall, a bottom 32*e*, and a top 32*f*. The material holding space is enclosed by the top 32*f* and extend downwardly toward the bottom 32*e* and terminates at an opening or chute of the material unloading assembly.

The material loading assembly 40 of the shipping container 10 is shown in FIG. 1 and further illustrated in FIGS. 2-10. The material loading assembly 40 generally includes a door structure 100 disposed over an opening (represented as a broken line in FIG. 3) in the top 32*f* and an operating mechanism 200 coupled to the door structure 100. The door structure 100 includes a rectangular door 110, a handle 122, and hinges 130. The rectangular door 110 pivots along its edge to rotate between fully open and closed positions. In the closed position, shown in FIG. 1, the rectangular door 110 covers the opening in the top 32*f* of the container body 30. To assist in securing the contents of the container body 30, the rectangular door 110 may include a gasket, coaming, or other sealing mechanism (not shown) on an underside of the rectangular door 110. This sealing mechanism may engage with the top 32*f* of the container body 30, to provide a seal. The rectangular door 110 includes a front edge 112, a rear edge 114, a first side edge 116, and a second side edge 118. In the illustrated embodiment, the rectangular door 110 also includes a flanged outer perimeter 120, which enables the door 110 to rest more securely in the closed position on top 32*f* of the container body 30. However, it should be understood that the rectangular door may not include a flanged outer perimeter or may include a flanged perimeter having a different shape than is shown. Furthermore, the door 110 is illustrated as having a rectangular shape, however, it should be understood that various other shapes such as a square, circle, oval, and more can be used instead. The shape of the door 110 may depend on or match the shape of the opening in the top of the container through which material is loaded. The handle 122 is connected to the front edge 112 of the rectangular door 110. The handle 122 enables a user to manually open and close the door 110. In the illustrated embodiment, the door 110 is connected to the top 32*f* of container body 30 via three hinges 130. The hinges 130 enable the door 110 to pivot between the fully open position and the closed position. While FIG. 1 illustrates the door structure 100 pivotably connected to the container body 30 via three hinges 130, it should be understood that more or fewer hinges may be used instead. Similarly, while the hinges 130 are shown as strap hinges, it should be understood that other types of hinges or coupling devices may be used to pivotably connect the door 110 to the top 32*f*.

The operating mechanism 200 generally includes an extension member 300 and a latch mechanism 400. The operating mechanism 200 is operable by a person standing adjacent to the bulk material shipping container 10. As discussed in further detail below, the operating mechanism 200 partially extends past an edge of the bulk material shipping container 10, enabling a user to engage the extension member 300 and latch mechanism 400 from the ground for locking and releasing the latch mechanism 400 and for opening and closing the door structure 100 by engaging the extension member 300.

In the illustrated embodiment, particularly in FIGS. 1-6, the extension member 300 includes an elongated arm 310 and an engagement pin 320. The extension member 300 is connected to the door structure 100, and partially extends past the edge (E in FIGS. 3-4 and 9) of the bulk material shipping container 10. The extension member 300 is engageable by a user standing on the ground adjacent to the container 10 (either directly, or by using a suitable device, depending on the height of the container 10). Where the container is relatively short (e.g., 5 feet tall), a user may directly lock or unlock the latch mechanism 400 and move the door structure 100 from open to closed or vice versa by grabbing the engagement pin 320. Alternatively, where the container is relatively tall (e.g., 9 feet tall), the user may lock or unlock the latch mechanism 400 and move the door structure 100 from open to closed or vice versa by contacting the engagement pin 320 with a suitable extension device such as a pole or other member. The pole may include a U-shaped end component configured to engage with the engagement pin 320 in various embodiments.

The elongated arm 310 includes a rectangular tube 312 having a plurality of attachment apertures 314*a*, 314*b*, 314*c*, and 314*d* (FIG. 5) formed therethrough, which receive suitable fasteners to affix the rectangular tube 312 to the front edge 112 of the rectangular door 110. The rectangular tube 312 extends from the front edge 112 past the first side edge 116 of the rectangular door 110. In the illustrated embodiment, the rectangular tube 312 is connected to the front edge 112. However, it should be understood that the rectangular tube 312 can alternatively be connected to a different edge (e.g., the first side edge), or to a top surface of the rectangular door 110. Furthermore, while the elongated arm 310 is illustrated as including a rectangular tube 312 having a rectangular cross-section, it should be understood that a different shape may be used instead, such as a square, circle, triangle, or any other suitable shape.

Figure 6:
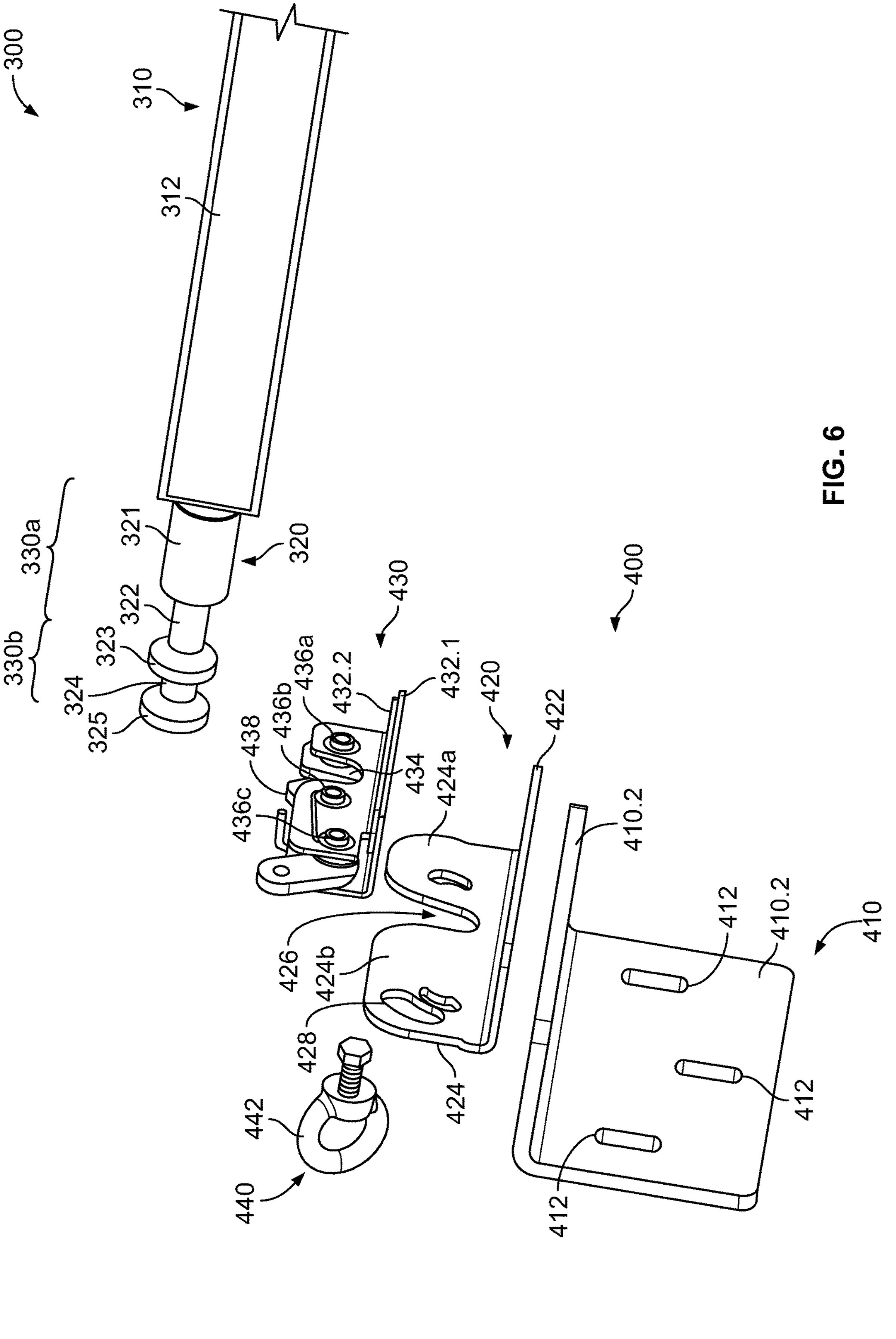
FIG. 6 is an expanded front perspective view of a latch mechanism and partial view of an extension member of the operating mechanism of FIG. 1.
Figure 7:
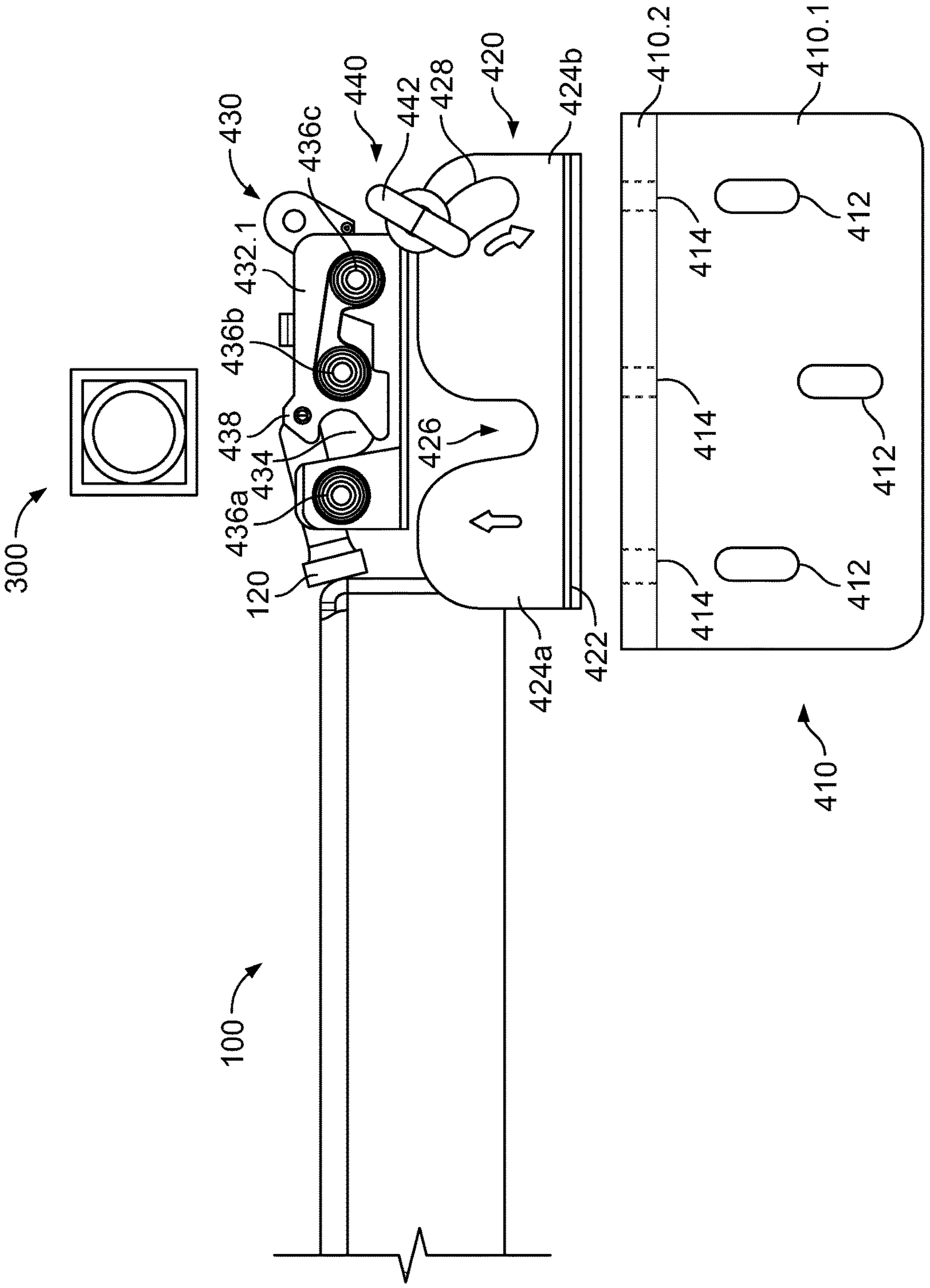
FIG. 7 is an exploded first side view of the latch mechanism of FIG. 6.
Figure 8:
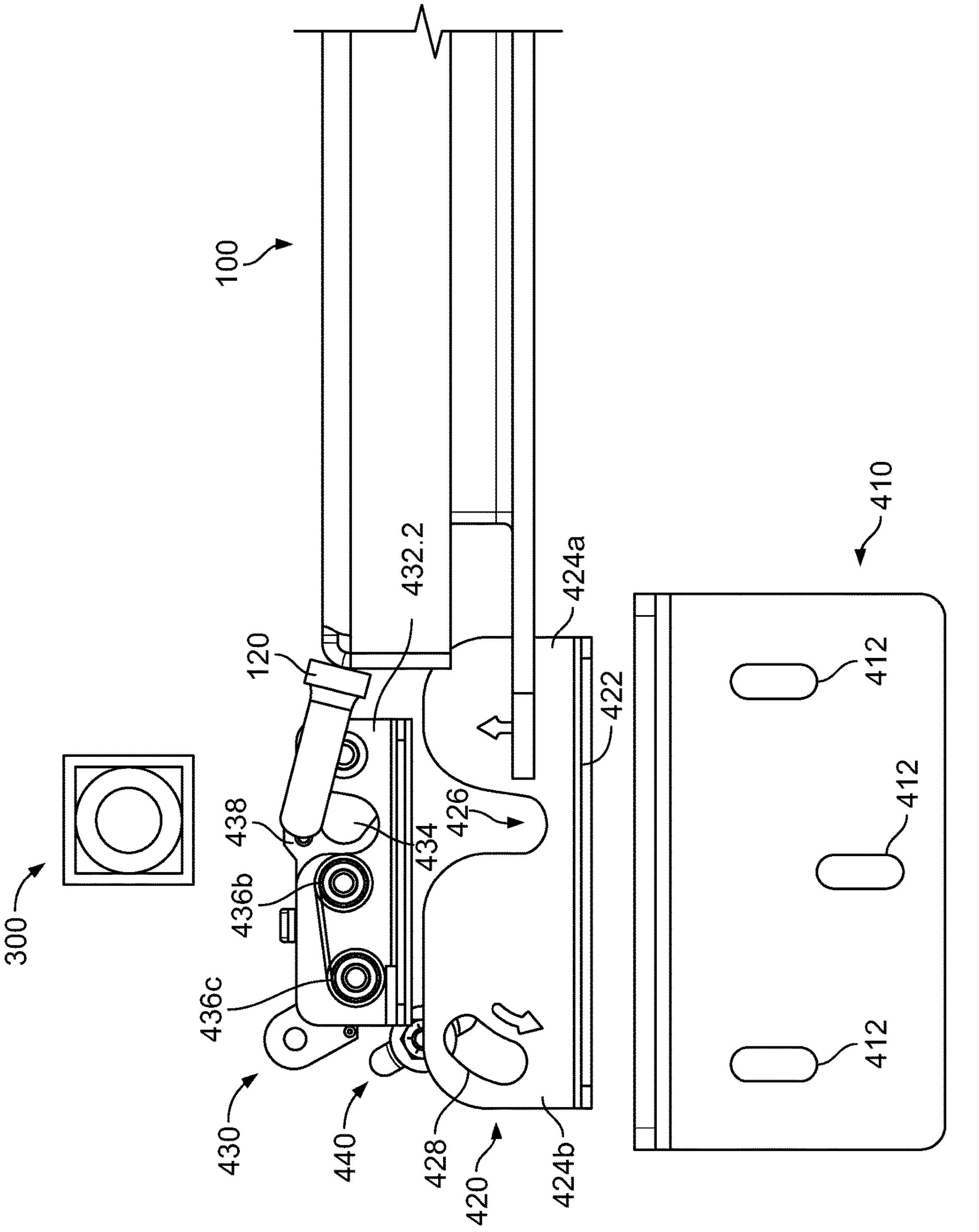
FIG. 8 is an exploded second side view of the latch mechanism of FIG. 6.
Figure 9:
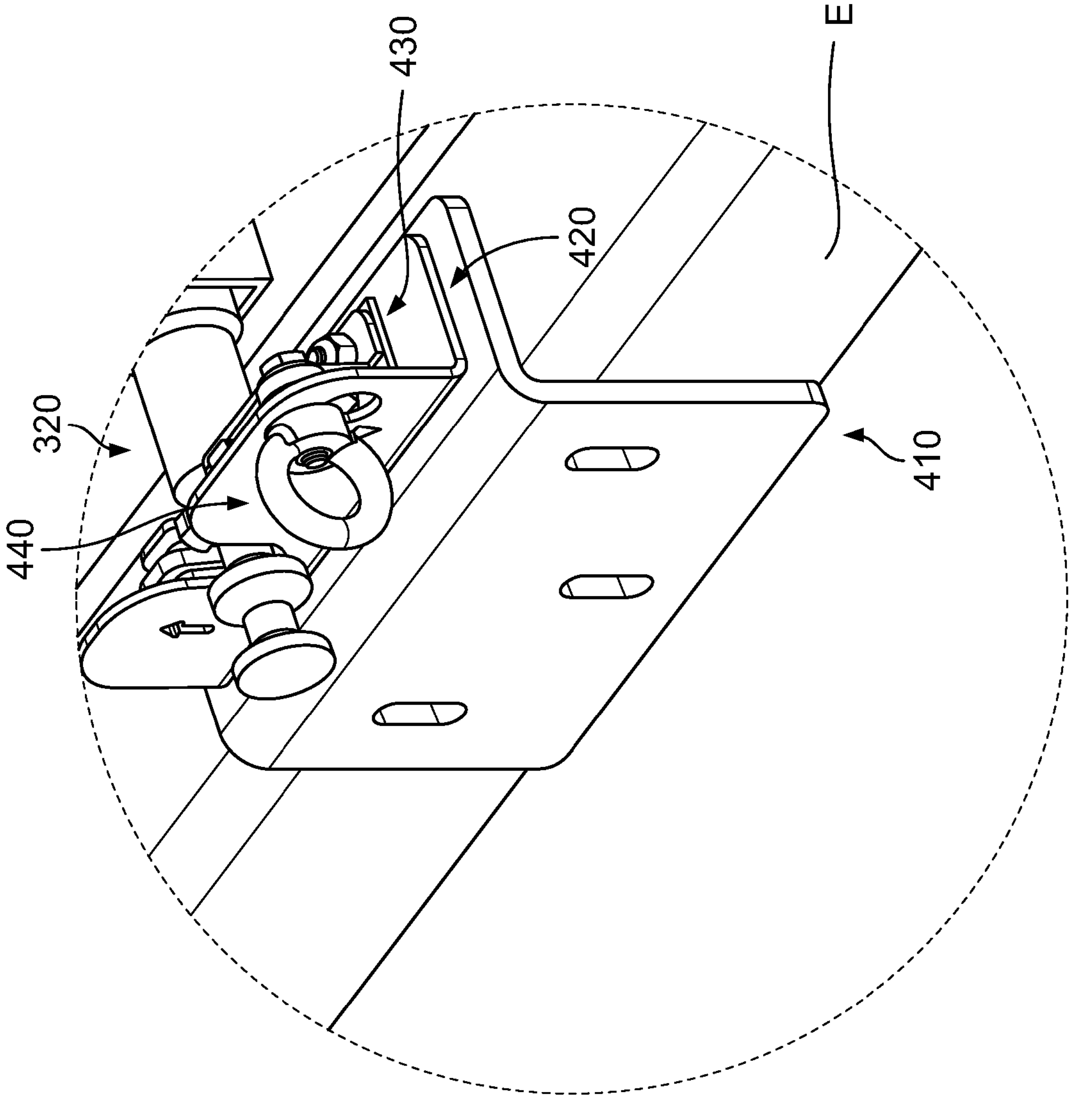
FIG. 9 is a side perspective view of the latch mechanism of FIG. 6.
Figure 10:
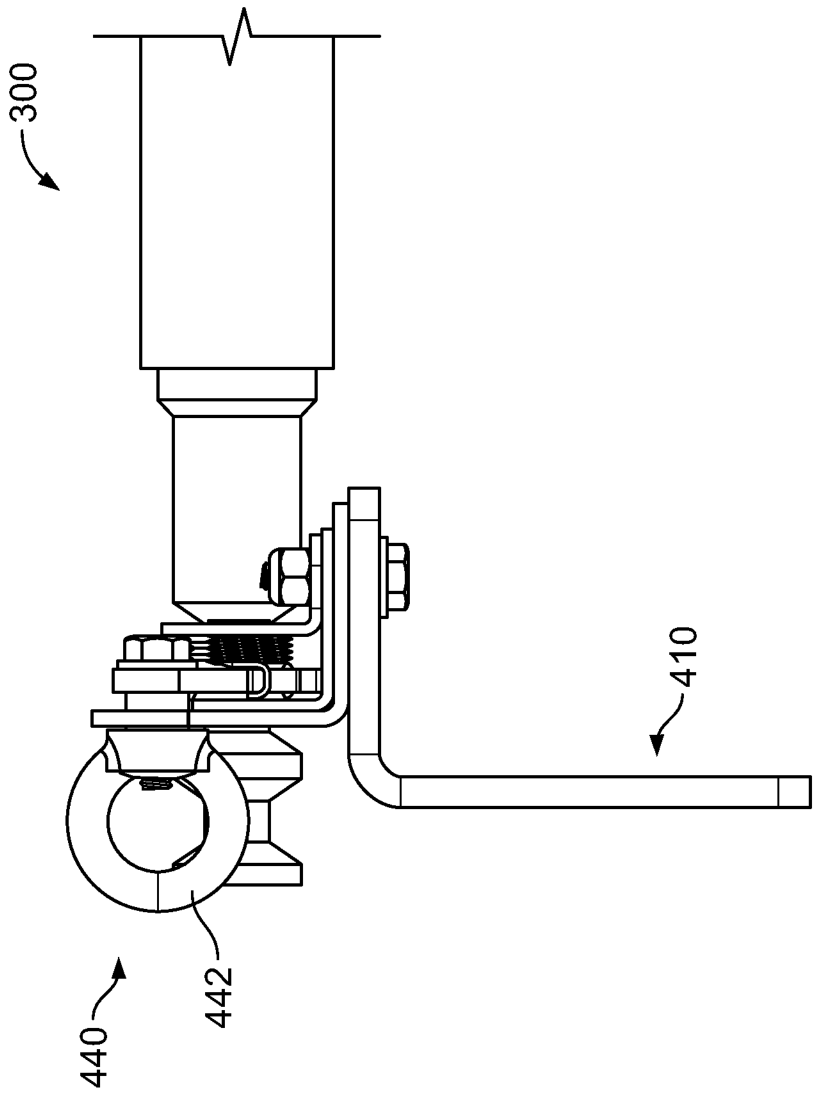
FIG. 10 is front view of the latch mechanism of FIG. 6.

The engagement pin 320, shown in greater detail in FIG. 6, includes a lock portion 330*a* which cooperates with the latch mechanism 400 and a handle portion 330*b* for the user to manipulate extension member 300. The lock portion 330*a* includes a shoulder 321 extending from the rectangular tube 312, a latch contact surface 322, and a guard 323 separating the handle portion 330*b* from the latch contact surface 322. The latch contact surface 322 is engageable with the latch mechanism 400 to prevent the door 110 from opening when the latch mechanism 400 is locked. The latch contact surface 322 is recessed with respect to the shoulder 321 and the guard 323. This engagement is best seen in FIGS. 9 and 10 and is described in further detail below. The handle portion 330*b* includes a grip 324 and a pommel 325. The grip 324 is recessed with respect to the guard 323 and the pommel 325 for engaging with a user or user controlled device (such as an extended pole) to open and close the door structure 100.

With reference now to FIGS. 1 and 6-10, the latch mechanism 400 is configured to engage the extension member 300, such that when the latch mechanism 400 is locked, the door structure 100 is prevented from opening. In the illustrated embodiment, the latch mechanism 400 includes an attachment bracket 410 affixed to the container 10, a lower capture member 420, an upper capture member 430 and a locking pin 440.

The attachment bracket 410 includes an L-shaped bracket having first and second flanges 410.1, 410.2 configured to wrap around an edge E of the bulk material shipping container 10. The attachment bracket 410 has a plurality of apertures 412 formed through the first flange 410.1 for receiving suitable fasteners to secure the attachment bracket 410 to the container 10. In the illustrated embodiment, the first flange 410.1 is affixed to the first side wall 32*c* of the container 10. The attachment bracket 410 has a plurality of apertures 414 (FIG. 7) formed in the second flange 410.2.

The lower capture member 420 includes an L-shaped bracket having a first plate 422 and a second plate 424. The lower capture member 420 is oriented opposite the attachment bracket 410 as shown. The first plate 422 includes a plurality of apertures (not shown) that align with the apertures 414 of the attachment bracket 410 for receiving suitable fasteners to secure the lower capture member 420 and upper capture member 430 to the attachment bracket 410. The second plate 424 has a pin slot 426 extends from an upper edge of the second plate 424 towards the first plate 422 as separates a first end region 424*a* and a second end region 424*b* of the second plate 424. The pin slot 426 is configured to receive the lock portion 330*a* of the engagement pin 320. In the illustrated embodiment, the pin slot 426 is wide enough to receive the latch contact surface 322 of the engagement pin 320 and narrow enough to prevent the shoulder 321 and the guard 323 from being received therein. The width of pin slot 426 restricts lateral sliding of the engagement pin 320 out of the pin slot 426. In other words, The shoulder 321 and the guard 323 will contact the second plate 424 to prevent lateral movement the engagement pin 320. The end region 424*b* has a locking pin aperture 428 formed therethrough. Locking pin 440 (described in further detail below) may be inserted through the locking pin aperture 428 to engage the upper capture member 430.

The upper capture member 430 is positioned in the same orientation as the lower capture member 420. The upper capture member 430 includes L-shaped brackets 432.1, 432.2 that are nested in a spaced relation. A pin seat 434 extends from an upper edge of the L-shaped brackets 432.1, 432.2 align with the pin slot 426 of the lower capture member 420. The first and second L-shaped brackets 432.1 432.2 are interconnected by suitable fasteners for securing the upper capture member 430, the lower capture member 420 and the attachment bracket 410. In this way, the fasteners are inserted through the attachment bracket 410, lower capture member 420, first L-shaped bracket 432.1, and second L-shaped bracket 432.2.

The first and second L-shaped brackets 432.1, 432.2 are spaced apart such that first, second, and third bearings 436*a*, 436*b*, and 436*c* are supported between upright plates thereof. The second bearing 436*b* and the third bearing 436*c* are connected to a movable locking member 438. The movable locking member 438 is movable to extend at least partially across the pin slot 426 in the lower capture member 420 and across the corresponding pin seats 434 in the first and second L-shaped bracket 432.1 and 432.2. The movable locking member 438 is movable between a locked position and an unlocked position. In the locked position, the movable locking member 438 extends across the pin slot 426 and the pin seats 434 to prevents the engagement pin 320 from moving out of the latch mechanism 400. In the unlocked position, the movable locking member 438 is moved out of the way such that it no longer spans the top of the pin slot 426 and pin seats 434 such that the lock engagement pin 320 is free to move out of engagement with the latch mechanism 400.

The locking pin 440 engages the movable locking member 438, to cause the movable locking member to move from the locked position to the unlocked position and vice versa. The locking pin 440 extends through the locking pin aperture 428 of the lower capture member. The locking pin aperture 428 is formed as an elongated arcuate slot for enabling the locking pin 440 to slide up and down to selectively position the movable locking member 438 between the locked (or closed) position and the unlocked (or open) position. The locking pin 440 includes a ring 442. The ring 442 provides an ergonomic contact member for a user to easily lock and unlock the latch mechanism 400. While a ring 442 is shown, it should be understood that any other suitable shape can be used.

As noted above, the bulk material shipping container 10 of the present disclosure enables a user to lock, unlock, open and close a door 110 on top of the bulk material shipping container while positioned on a side of the container. To close the door 11-, the user reaches up and engages the handle portion 330*b* of the engagement pin 320 on the operating mechanism 200 (either by hand or using a device such as an extended pole). The user lifts the engagement pin 320, which is connected to the front edge 112 of the door 110. As the engagement pin 320 and door 110 rotate from the open position to the closed position, the engagement pin 320 moves along an arc. When the engagement pin 320 reaches the top of the arc, the door 110 is in an upright position. The user continues to move the engagement pin 320 and lowers the door 110 into the closed position. The user lowers the engagement pin 320 until the latch contact surface 322 enters the latch mechanism 400. Once the door is in the closed position, the user can lock the door in this position by locking the latch mechanism 400. To do this, the user engages the locking pin 440 of the latch mechanism 400 to move the moveable locking member 438 into the locked position, which prevents the engagement pin 320 from moving out of the latch mechanism 400. All of the above steps can be performed from the side of the container. To unlock and open the door, the same procedure can be performed in reverse.

It should be appreciated that suitable instructional marking or labels may be placed on or connected to the container of the present disclosure to instruct the users, operators, loaders, or unloaders on how to use, load, unload, and/or move the container in accordance with the present disclosure. It should further be appreciated that the attachment of the various components of the container can be performed in any suitable way such as by welding (including but not limited to laser welding) and by suitable fasteners (such as but not limited to rivets and bolts and nuts). It should also be appreciated that the present disclosure contemplates the elimination or reduction of sharp edges in the container body and that any sharp edges can be curved or formed with a suitable radius.

What is claimed:

1. A material shipping container comprising:

a container body having a top enclosing a material containing space;

a material loading assembly disposed over an opening formed in the top of the container body, the material loading assembly including:

a door attached to the top of the container body and moveable between an open position to reveal the opening and a closed position to conceal the opening, wherein the door is centrally located at the top of the container body; and an operating mechanism comprising:

an extension member, the extension member comprising an elongated arm, having a first end and a second end, and an engagement pin, wherein the extension member partially extends past an edge of the container body, and wherein the elongated arm is connected to a front edge of the door via the first end, and the engagement pin is formed at the second end, wherein the elongated arm includes a tube having a plurality of attachment apertures formed to receive a plurality of fasteners to affix the elongated arm to the front edge of the door, wherein the elongated arm extends from the front edge of the door past a side edge of the door; and a latch mechanism connected at the edge of the container body, the latch mechanism having a pin seat formed therein and a locking member positionable between a locked position and an unlocked position, wherein the locking member in the locked position retains the engagement pin in the pin seat for locking the door in the closed position, and the locking member in the unlocked position releases the engagement from the pin seat for unlocking the door in the closed position so the door is free to move from the closed position to the open position, wherein the engagement pin comprises a lock portion and a handle portion spaced apart from the lock portion, wherein the extension member and latch mechanism are configured such that a user standing adjacent to the container body engages the extension member and latch mechanism for locking and releasing the latch mechanism and engages the extension member for opening and closing the door.

2. The material shipping container of claim 1, wherein the material loading assembly further comprises a hinge operably coupling a first edge of the door to the container body, wherein the extension member includes an elongated arm connected to a second end of the door opposite the first edge.

3. The material shipping container of claim 1, wherein the latch mechanism comprises:

an attachment bracket connected to a side wall of the container body, a lower capture member having a pin slot formed therein, and an upper capture member having the pin seat formed therein and supporting the locking member;

wherein the lower and upper capture members are secured to the attachment bracket so that the pin slot and pin seat are in alignment for receiving the lock portion of the engagement pin when the door is in the closed position.

4. The material shipping container of claim 3, further comprising a locking pin coupled to the locking member for locking and unlocking the latch mechanism.

5. The material shipping container of claim 4, wherein the locking pin extends through a locking pin aperture formed in the lower capture member.

6. The material shipping container of claim 3, wherein the upper capture member includes a pair of brackets arranged in spaced relation and having a bearing element disposed therebetween for supporting the locking member.

7. A material loading assembly for a shipping container having a top enclosing a material containing space, the material loading assembly comprising:

a door configured to cover an opening in the top of the shipping container, wherein the door is centrally located at the top of the shipping container;

an operating mechanism comprising:

an extension member, the extension member comprising an elongated arm, having a first end and a second end, and an engagement pin, wherein the extension member partially extends past an edge of the container body, and wherein the elongated arm is connected to a front edge of the door via the first end, and the engagement pin is formed at the second end, wherein the elongated arm includes a tube having a plurality of attachment apertures formed to receive a plurality of fasteners to affix the elongated arm to the front edge of the door, wherein the elongated arm extends from the front edge of the door past a side edge of the door; and a latch mechanism configured to be attached at the edge of the shipping container, the latch mechanism having a pin seat formed therein and a locking member positionable between a locked position and an unlocked position, wherein the locking member in the locked position retains the engagement pin in the pin seat for locking the door in a closed position, and the locking member in the unlocked position releases the engagement from the pin seat for unlocking the door in the closed position so the door is free to move from the closed position to an open position, wherein the engagement pin comprises a lock portion and a handle portion spaced apart from the lock portion, wherein the extension member and latch mechanism are configured such that a user standing adjacent to the shipping container engages the extension member and latch mechanism for locking and releasing the latch mechanism and engages the extension member for opening and closing the door.

8. The material loading assembly of claim 7, further comprising a hinge extending from a first edge of the door and configured to couple with the shipping container, wherein the extension member includes an elongated arm connected to a second end of the door opposite the first edge.

9. The material loading assembly of claim 7, wherein the latch mechanism comprises:

an attachment bracket configured to connect to the shipping container, a lower capture member having a pin slot formed therein and an upper capture member having the pin seat formed therein and supporting the locking member;

wherein the lower and upper capture members are secured to the attachment bracket so that the pin slot and pin seat are in alignment for receiving the lock portion of the engagement pin when the door is in the closed position.

10. The material loading assembly of claim 9, further comprising a locking pin coupled to the locking member for locking and unlocking the latch mechanism.

11. The material loading assembly of claim 10, wherein the locking pin extends through a locking pin aperture formed in the lower capture member.

12. The material loading assembly of claim 9, wherein the upper capture member includes a pair of brackets arranged in spaced relation and having a bearing element disposed therebetween for supporting the locking member.

* * * * *